US007719965B2

(12) United States Patent (10) Patent No.: US 7,719,965 B2
Monk et al. (45) Date of Patent: May 18, 2010

(54) METHODS AND SYSTEMS FOR COORDINATED MONITORING OF NETWORK TRANSMISSION EVENTS

(75) Inventors: John M. Monk, Monument, CO (US); Timothy M. Bennett, Colorado Springs, CO (US); Scott A. Blomquist, Colorado Springs, CO (US)

(73) Assignee: Agilent Technologies, Inc., Santa Clara, CA (US)

( * ) Notice: Subject to any disclaimer, the term of this patent is extended or adjusted under 35 U.S.C. 154(b) by 1561 days.

(21) Appl. No.: 10/926,191

(22) Filed: Aug. 25, 2004

(65) Prior Publication Data

US 2006/0056389 A1 Mar. 16, 2006

(51) Int. Cl.
*G06F 11/00* (2006.01)
*G06F 15/173* (2006.01)

(52) U.S. Cl. .................. 370/229; 370/252; 709/224
(58) Field of Classification Search ......... 370/229–232, 370/236, 241, 241.1, 252, 253, 389, 400, 370/401, 412, 413, 415, 417; 709/238, 244, 709/223, 224; 710/15, 17, 18; 714/1, 25, 714/27, 4, 39, 47
See application file for complete search history.

(56) References Cited

U.S. PATENT DOCUMENTS

| 5,315,580 | A | * | 5/1994 | Phaal | 370/232 |
|---|---|---|---|---|---|
| 5,365,514 | A | * | 11/1994 | Hershey et al. | 370/241 |
| 5,426,741 | A | * | 6/1995 | Butts et al. | 710/18 |
| 6,381,656 | B1 | * | 4/2002 | Shankman | 710/18 |
| 6,532,554 | B1 | * | 3/2003 | Kakadia | 714/47 |
| 6,577,597 | B1 | * | 6/2003 | Natarajan et al. | 370/232 |
| 6,594,774 | B1 | * | 7/2003 | Chapman et al. | 714/2 |
| 6,859,829 | B1 | * | 2/2005 | Parupudi et al. | 709/224 |
| 6,931,524 | B2 | * | 8/2005 | Ehmann et al. | 713/100 |
| 6,973,034 | B1 | * | 12/2005 | Natarajan et al. | 370/232 |
| 7,016,957 | B2 | * | 3/2006 | Morimoto et al. | 709/224 |
| 7,017,071 | B2 | * | 3/2006 | Katayama et al. | 714/4 |

(Continued)

FOREIGN PATENT DOCUMENTS

EP 1150212 A2 10/2001

(Continued)

OTHER PUBLICATIONS

"Network Troubleshooting Center—Technical Overview," 5988-8548EN. © Agilent Technologies, Inc. 2003. Printed in U.S.A. Oct. 15, 2003.

(Continued)

*Primary Examiner*—Aung S Moe
*Assistant Examiner*—Kerri M Rose

(57) ABSTRACT

Methods and systems for coordinated monitoring of network transmission events. Predetermined information for the network transmission event is obtained at a first network location and the network transmission event predetermined information is provided to a predetermined monitoring location (or server). From the predetermined monitoring location, the predetermined information is provided to other network monitoring devices at one or more other network locations. At the one or more other network locations, the network transmission event, corresponding to the predetermined information obtained at the first location, is monitored. Network transmission event information, corresponding to the predetermined information obtained at the first location, is provided to the predetermined monitoring location from the first location and the other network locations. The monitoring of network transmission can be thereby coordinated.

14 Claims, 7 Drawing Sheets

U.S. PATENT DOCUMENTS

| | | | |
|---|---|---|---|
| 7,035,210 B2 * | 4/2006 | Walles | 370/229 |
| 7,143,197 B1 * | 11/2006 | Lloyd | 709/250 |
| 7,349,964 B2 * | 3/2008 | Motoyama et al. | 709/224 |
| 2002/0019870 A1 * | 2/2002 | Chirashnya et al. | 709/224 |
| 2004/0066753 A1 | 4/2004 | Grovenburg | |
| 2005/0144505 A1 * | 6/2005 | Takeuchi et al. | 714/4 |

FOREIGN PATENT DOCUMENTS

| | | |
|---|---|---|
| JP | 03044124 A | 2/1991 |
| JP | 09247150 A | 9/1997 |
| WO | WO98/00939 A1 | 1/1998 |

OTHER PUBLICATIONS

Hardman, D. "Noise and Voice Quality in VoIP Environments—White Paper," 5988-9345EN. © Agilent Technologies, Inc. 2003. Printed in U.S.A. Apr. 23, 2003.

Schulzrinne, H. et al. "RTP: A Transport Protocol for Real-Time Applications." © The Internet Society 2003. Retrieved from www.ietf.org/rfc/rfc3550.txt on Aug. 17, 2004.

* cited by examiner

METHODS AND SYSTEMS FOR COORDINATED MONITORING OF NETWORK TRANSMISSION EVENTS

BACKGROUND OF THE INVENTION

This invention relates generally to monitoring network transmission.

The needs for coordinated monitoring of network transmission can be best described by reference to the following particular application.

Worldwide deregulation and packet-switched technology have brought dramatic changes to the telecommunications industry. Voice communication over packet-switched networks, such as, the Internet, is now in demand. Voice Over the Internet technology is now available which integrates a public switched telephone network (PSTN) and the Internet. Voice over the Internet technology is also referred to as, Voice over Internet Protocol (VoIP), Voice over IP (VOIP) uses the Internet Protocol (IP) to transmit voice as packets over a network using the Internet Protocol. So VoIP can be achieved on any data network that uses the Internet Protocol, like Internet, Intranets and Local Area Networks (LAN). In order to transmit a phone call over a data network that uses the Internet Protocol, the voice signal has to be digitized, (in some cases compressed) and converted to IP packets and then transmitted over the IP network. In addition to the voice data (sometimes called media), signaling data is also sent. Signaling protocols are used to initiate and end calls and carry information required to locate users. Internet telephony is desirable since the cost involved is very low.

A PSTN can include transmission components (links), switching components (nodes), and billing facilities. The Internet can be any network or combination of networks that support packet-switching. Such a network can include, but is not limited to, a network supporting the Internet Protocol (IP) and related protocols.

VoIP systems allow a call originating from a PSTN to be carried over the Internet. However, VoIP calls can originate from phones, sometimes referred to as IP phones, not connected to a PSTN. In both instances, voice traffic can be carried over the Internet bypassing more expensive long-distance carriers.

A VoIP system should perform to the level of service obtained from a PSTN based system. Among the key factors in obtaining the substantially the same level of service is the Quality of voice. The Quality of voice is influenced by the choice of codec, echo control, packet loss, delay, delay variations (jitter) and the design of the network. As IP was designed for carrying data, it does not provide real time guarantees but only provides best effort service. For voice communications over IP to become acceptable to the users, the delay needs to be less than a threshold value.

To reduce or avoid noise and distortion in a VoIP network (or any network for that matter), it is important to be able to characterize it or measure it in some way.

For VoIP, specialized testing methods are often used.

In VoIP network testing significant information can be obtained by passive monitoring. Passive monitoring is a testing method in which the test device or process "listens" to some aspect of the voice traffic to gather statistics and perform various types of analysis. Passive monitoring is non-intrusive and does not affect voice traffic or network behavior. It is often used in digital environments in which information, which is encapsulated in frames, cells, or packets, can be used to alert test personnel of a problem, or can be analyzed later to determine problem causes and identify traffic trends. The results of the passive testing can be used to obtain predictive MOS (Mean Opinion Score) results.

In one embodiment of passive monitoring, individual monitoring devices report testing results to a central location or server. This reporting identifies the status or "worst case" condition observed at one or more points in the network. It is likely that points in the network are reporting a wide range of abnormal (possible "worst case") conditions. Therefore, it is difficult to diagnose where in the network the "worst case" condition exists or the nature of the root cause of the error ("worst case") condition.

Hence, there is a need for coordinating the collection of information about an individual call across multiple network segments in order to provide end-to-end analysis.

In other data networks, there is also a need for coordinating the collection of information about an individual network transmission across multiple network segments in order to provide end-to-end analysis.

BRIEF SUMMARY OF THE INVENTION

The needs for the invention set forth above as well as further and other needs and advantages of the present invention are achieved by the embodiments of the invention described hereinbelow.

Methods and systems for coordinated monitoring of network transmission events are disclosed.

The method of this invention includes monitoring a network transmission event at a network location (also called the first location) and detecting a predecided condition in the network transmission event at that network location. In one embodiment, "predecided condition" means the information related to any (presumably, but not limited to) incorrect network behavior or condition that is of interest. Information for the network transmission event is then obtained at that network location and the network transmission event information is provided to a central (predetermined) monitoring location (or server). From the central monitoring location, the information related to the event is provided to one or more other network monitoring devices at one or more other network locations. At the one or more other network locations, the network transmission event, corresponding to the predetermined information obtained at the first location, is monitored. Network transmission event information, corresponding to the information initially obtained at the first location, is provided to the central monitoring location from the first location and the one or more other network locations. The monitoring of network transmission can thereby be coordinated.

Systems that implement the methods and computer program products that have computer readable code, which executes the method, embodied therein are also disclosed.

For a better understanding of the present invention, together with other and further needs thereof, reference is made to the accompanying drawings and detailed description and its scope will be pointed out in the appended claims.

DETAILED DESCRIPTION OF THE INVENTION

Methods and systems for coordinated monitoring of network transmission events are disclosed hereinbelow.

Figure 1:
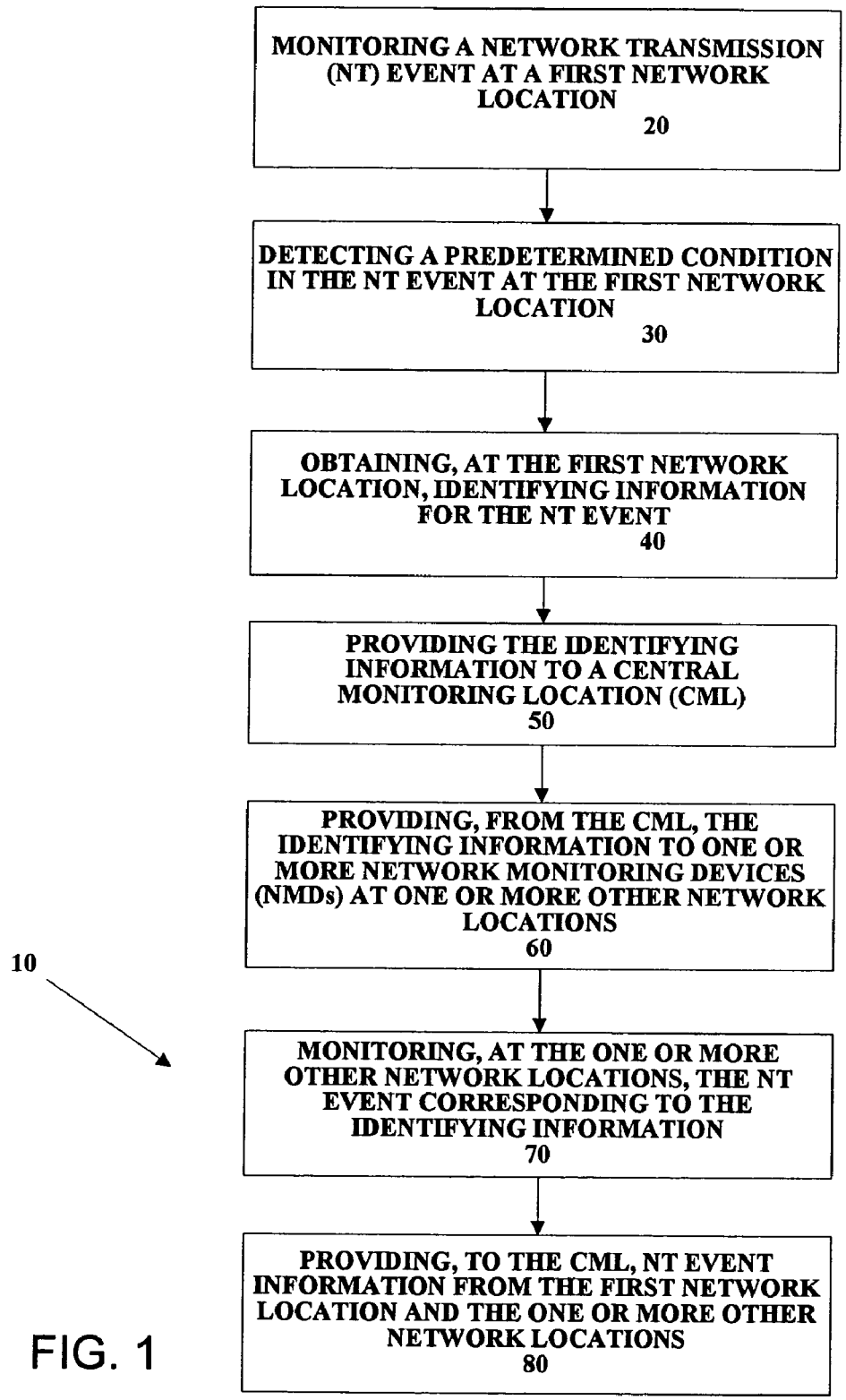
FIG. 1 is a schematic flow diagram representation of an embodiment of the method of this invention.

A flow diagram representation of an embodiment of the method of this invention is shown in FIG. 1. Referring to FIG. 1, a network transmission event is monitored at a network location (step 20, FIG. 1; the network location is also referred to as the first network location) and identifying (predetermined) information is obtained for the network transmission event (step 40, FIG. 1). After detecting a predetermined condition in the network transmission event at the first network location (step 30, FIG. 1), the identifying information is provided to a central monitoring location (step 50, FIG. 1). From the central monitoring location, the identifying information is provided to one or more network monitoring devices at one or more other network locations (step 60, FIG. 1). At the one or more other network locations, the network transmission event corresponding to the identifying information is monitored (step 70, FIG. 1) and network transmission event information from the first network location and the one or more other network locations is provided to the central monitoring location (step 80, FIG. 1). The monitoring of the network transmission event corresponding to the identifying information is, thereby, coordinated throughout the network.

By means of coordinating the monitoring of the network transmission event, at the central monitoring location, the location and nature of the root cause of the predetermined condition can be obtained.

Figure 2:
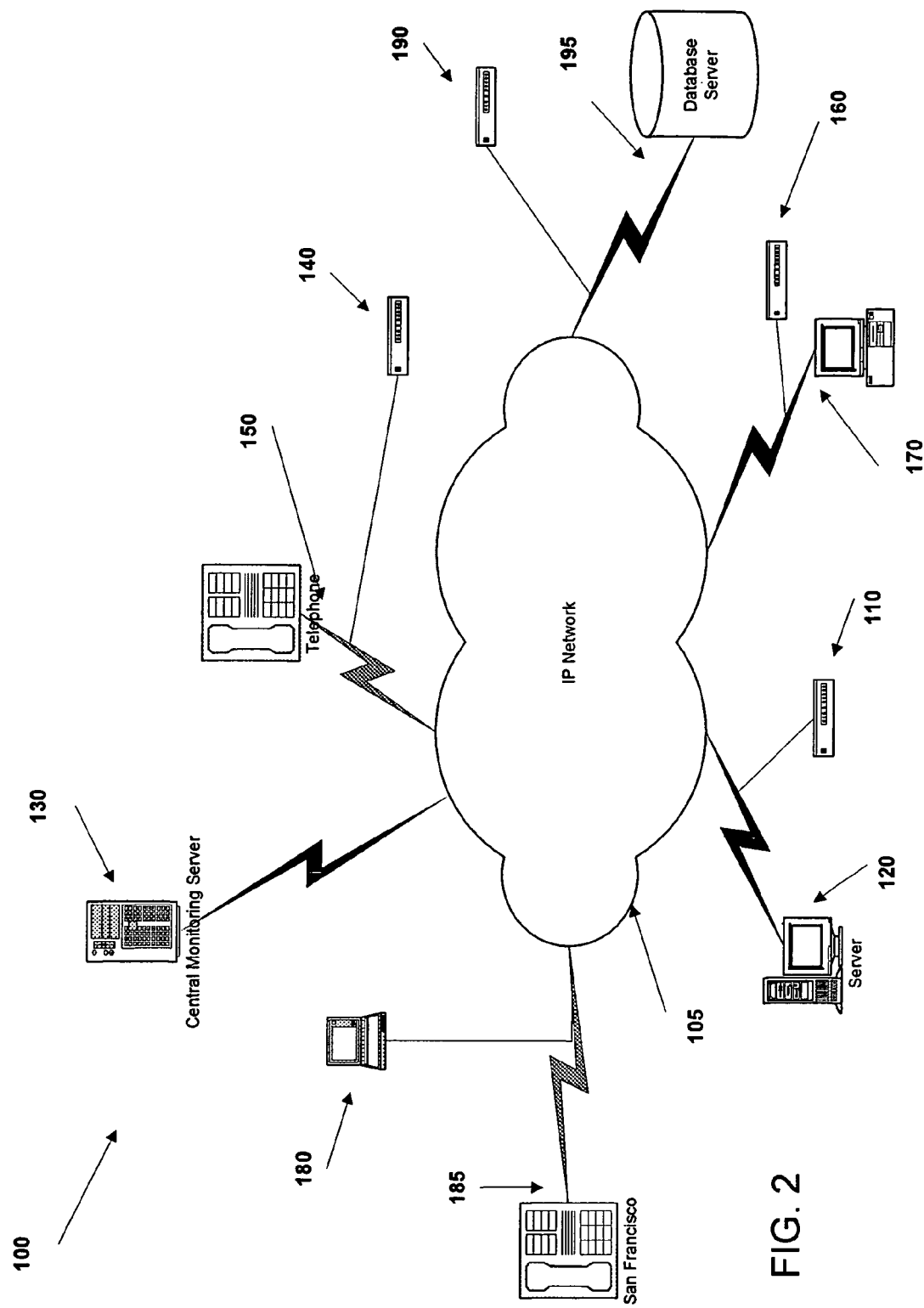
FIG. 2 is graphical schematic representation of an embodiment of the system of this invention.
Figure 3:
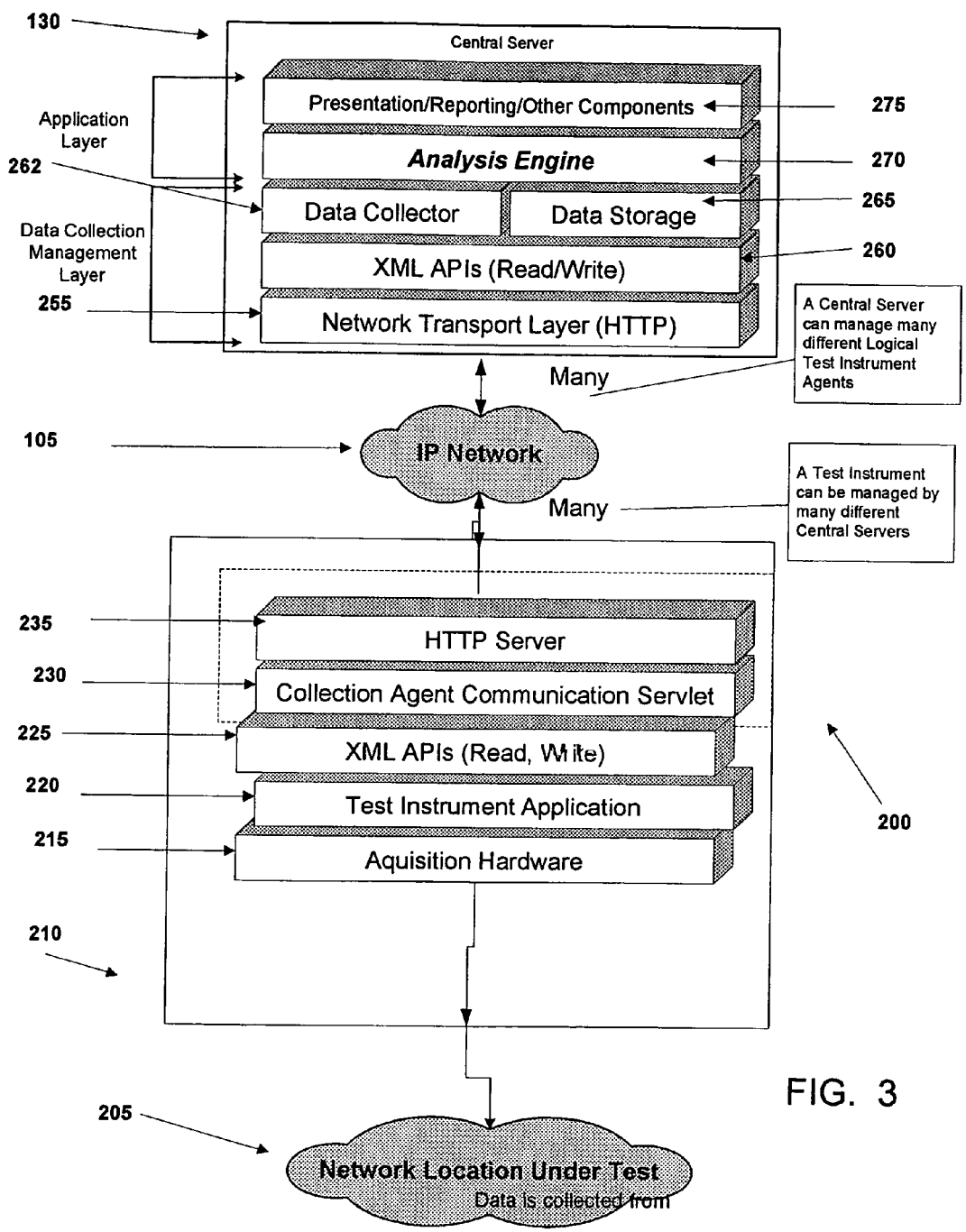
FIG. 3 is another schematic representation of an embodiment of the system of this invention.

A graphical representation of an embodiment 100 of the system of this invention is shown in FIG. 2 and another schematic representation of an embodiment 200 of the system of this invention is shown in FIG. 3. Referring to FIGS. 2 and 3, the embodiment 100 of the system of this invention shown in FIG. 2 includes a network monitoring subsystem 110 capable of monitoring a network transmission event at a network location 120, a central monitoring subsystem (server) 130, and a number of other network monitoring devices 140, 160, 180, 190 at a number of other network locations 150, 170, 185, 195. In one embodiment, both the network monitoring subsystems 110, 140, 160, 180, 190 and the central monitoring subsystem (server) 130 are based on based on an implementation such as, but not limited to, that shown in FIG. 4, where the subsystem includes a network interface component 320, one or more processors 310, one or more computer readable memories 360, and at least one other computer readable memory 340. The network interface component 320, the one or more processors 310, the one or more computer readable memories 360, and the one or more computer readable memories 340 are operably connected by means of a interconnection means 325 (such as, but not limited to, a common "bus").

The schematic representation shown in FIG. 3 depicts the embodiment 200 of the system of this invention utilizing a layer representation (similar to that used to depict protocols). Referring to FIG. 3, a network monitoring subsystem 110 acquires the data from a network transmission event at a first network location such as network location 120 in FIG. 2 (the network location 205 in FIG. 3 can correspond to any network location in FIG. 2) by means of the acquisition hardware 215 (the acquisition hardware can be similar, but is not limited to, to that found in network analyzers such as the "J6800A Network Analyzer" of AGILENT TECHNOLOGIES, Inc.). The data is analyzed by means of a test instrument application code 220. The test instrument application code 220 provides the means for detecting a predetermined condition in the network transmission event at the network location and obtaining, at the network location 205, identifying information for the network transmission event. In one embodiment, the protocol datagram for the protocol utilized in the network transmission provides either the data to be compared against a threshold or to be processed and compared against a threshold in order to determine whether a predetermined condition has occurred. Similarly, the identifying information for the network transmission event is also contained in the protocol datagram. In the embodiment shown in FIG. 3, software used for communicating with the central monitoring subsystem 130 (the XML APIs 225, the communication servlet 230 and the HTTP server 235 provide the software (code) in the embodiment shown) in conjunction with the processor 310 and the network interface 320 constitute the means for providing the identifying information to the central monitoring subsystem 130.

At the central monitoring subsystem 130, the identifying information is received and stored by means of the software used for communicating (such as, in the embodiment shown, the HTTP layer 255, the XML APIs 260) and software for data collection 262 and for data storage 265. The identifying information is provided, from the central monitoring subsystem 130, to one or more other network monitoring devices at the other network locations (such as network monitoring devices 140, 160, 180, 190 at a number of other network locations 150, 170, 185, 195 in FIG. 2) by means of software used for communicating with the network monitoring device 210 (the HTTP layer 255, the XML APIs 260 in the embodiment shown in FIG. 3), software to retrieve and provide the identifying information (which can, in one embodiment, reside in the Analysis Engine 270) and the processor 310 and the network interface 320. At the other network locations, the network transmission event corresponding to the identifying information is monitored by means of acquisition hardware 215 and test instrument application code 220. Each of the network monitoring devices, the network monitoring device 110 at the first network location 120 and the other network monitoring device 140, 160, 180, 190 at the other network locations 150, 170, 185, 195 in FIG. 2, provides network transmission event information corresponding to the identifying information to the central monitoring subsystem 130 by means of software used for communicating with the central monitoring subsystem 130.

Figure 4:
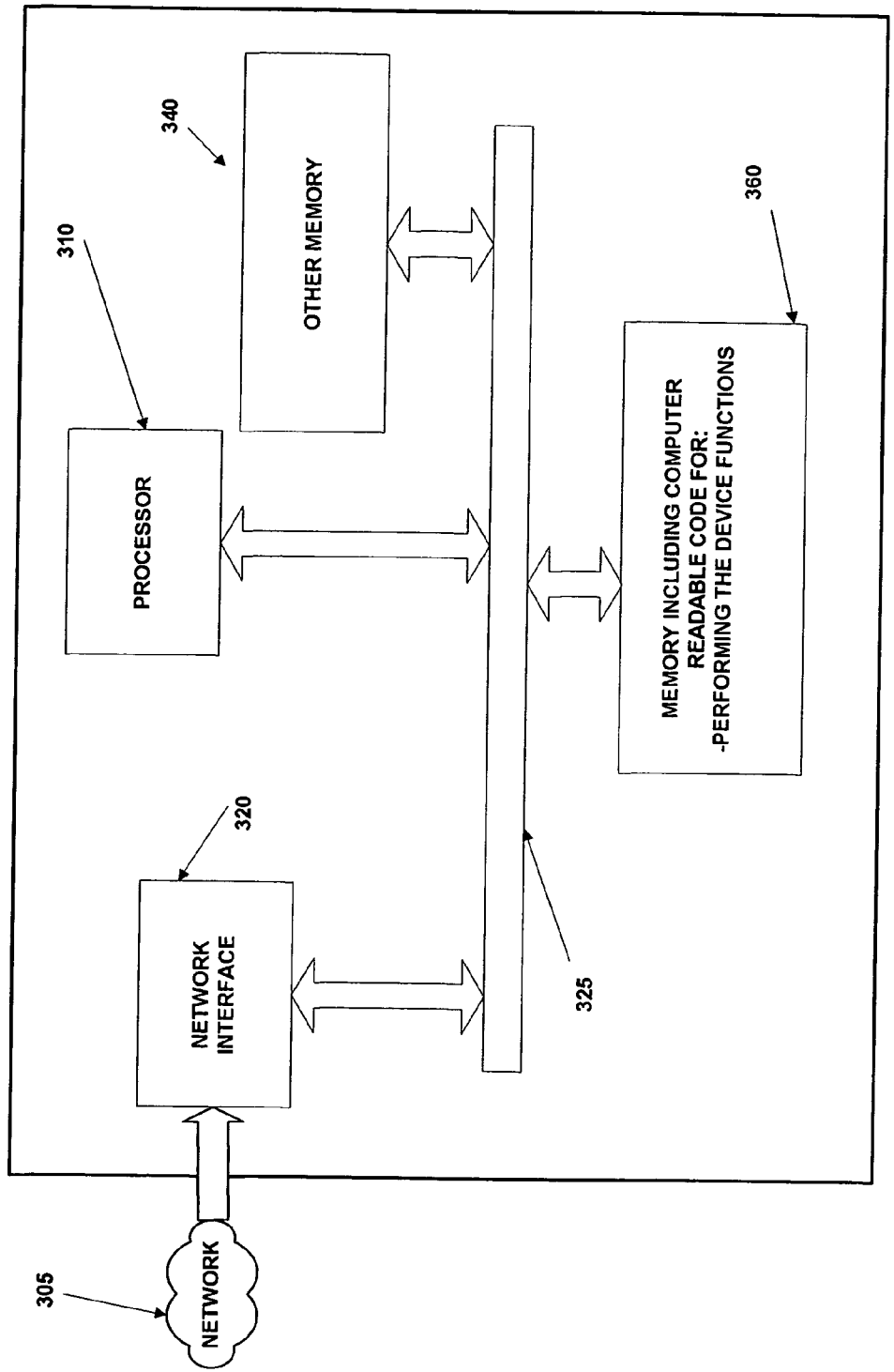
FIG. 4 is schematic block diagram representation of an embodiment of the components of the system of this invention.

The one or more computer readable memories, such as one or more computer readable memories 360 in FIG. 4, in each of the network monitoring devices and in the central monitoring subsystem 130 has readable code embodied therein, the computer readable code capable of causing at least one processor in each of the network monitoring devices and in the central monitoring subsystem 130 to monitor a network transmission event at a first network location, detect a predetermined condition in the network transmission event at the first network location, obtain, at the first network location, identifying information for the network transmission event, provide the identifying information to a central monitoring subsystem 130, provide, from the central monitoring subsystem 130, the identifying information to one or more network monitoring devices at one or more other network locations, monitor, at the one or more other network location, the network transmission event corresponding to the identifying information, and provide, to the central monitoring subsystem, network transmission event information for the network transmission event corresponding to the identifying information from the first network location and from the one or more other network locations. While in the preceding example the network monitoring subsystem 110 provides the identifying information to a central monitoring server 130 (location), the location of the network monitoring subsystem that provides the identifying information to the central monitoring location is not a limitation of this invention. Any of the other network monitoring devices 140, 160, 180, or 190 could be the network monitoring subsystem (device) that provides the identifying information to the central monitoring server (location).

Figure 5:
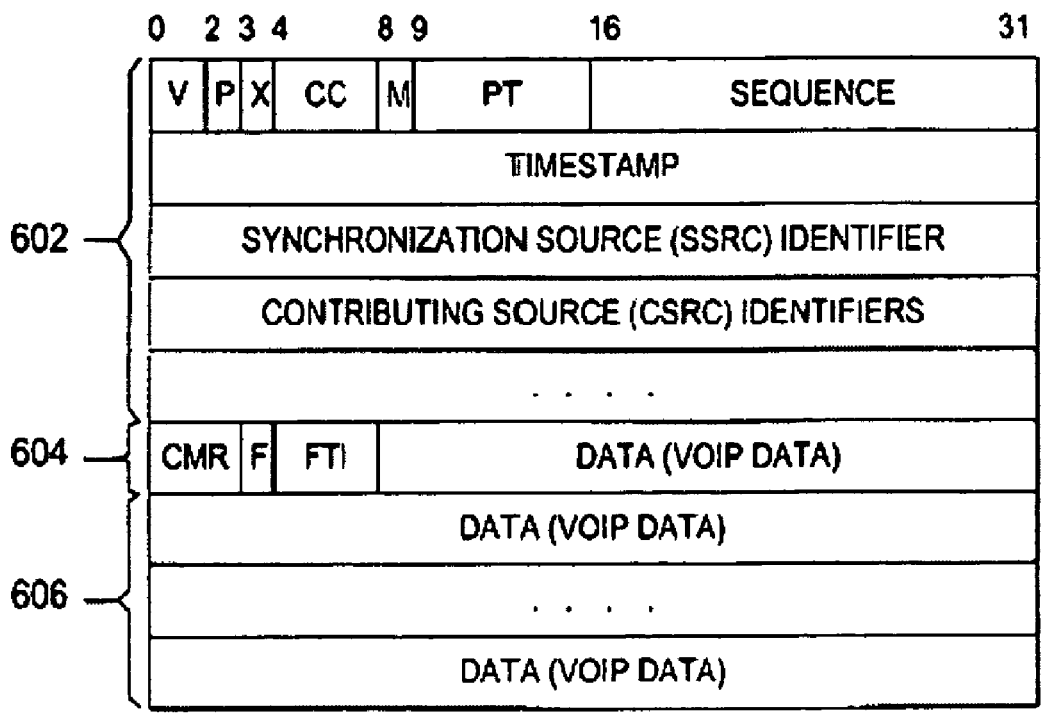
FIG. 5 is schematic representation of a conventional RTP datagram.

In order to even more clearly understand the present invention, reference is now made to the following illustrative embodiment. Referring again to FIG. 2, a calling telephone 150 (i.e., source) and a receiving telephone 185 (i.e., receiver) access a network 105 utilizing VoIP (Voice Over Internet Protocol) (In one embodiment gateways can be used to connect the phones to the network). The VoIP call is routed between the source 150 and the receiver 185 over the network 105, using Internet Protocol, and through a number of gatekeeper servers such as server 120 and server 170. A signaling protocol (such as SIP or H.323) establishes a transmit and receive channel over the IP network 105. The VoIP data communication utilizes the Real-Time Transport Protocol/ User Datagram Protocol/Internet Protocol (RTP/UDP/IP)as the protocol stack. An example of an RTP datagram is shown in FIG. 5. The RTP fields include fields for a sequence number, time stamp, synchronization source identifiers, and contributing source identifiers. (RTP is defined in RFC3550, "RTP: A Transport Protocol for Real-time applications", July 2003, available at http://www.ietf.org/rfc/rfc3550.txt, which is herein incorporated by reference.)

Figure 6:
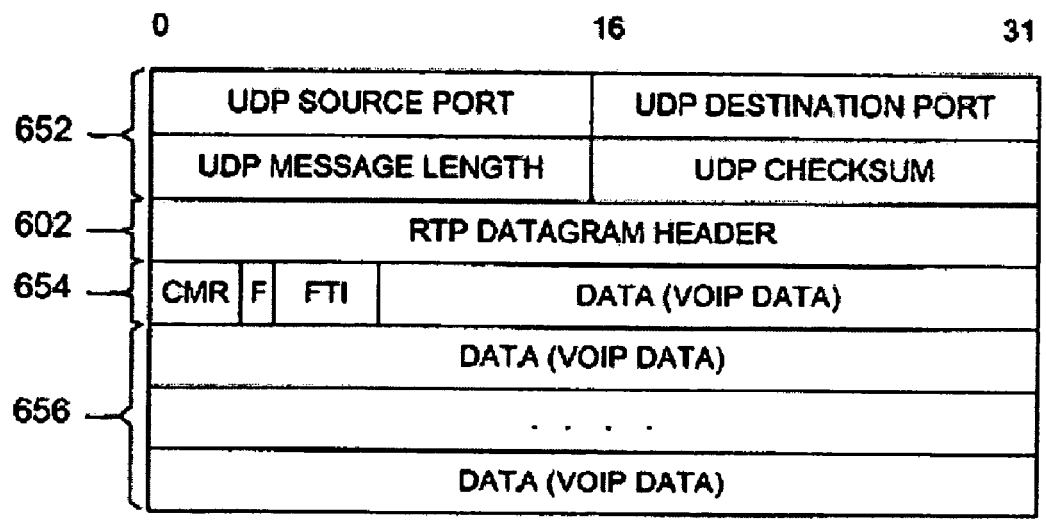
FIG. 6 is schematic representation of a conventional UDP datagram.

For the source and the receiver, an RTP session is defined by a particular pair of destination transport addresses one network address plus a port pair for RTP and RTCP). A UDP datagram is shown in FIG. 6 illustrating the port information. Referring to FIG. 5, the timestamp indicates the sampling instant of the first octet in the RTP data packet. The sequence number increments by one for each RTP data packet sent, and can be used to detect packet loss. The SSRC field uniquely identifies the source.

Figure 7:
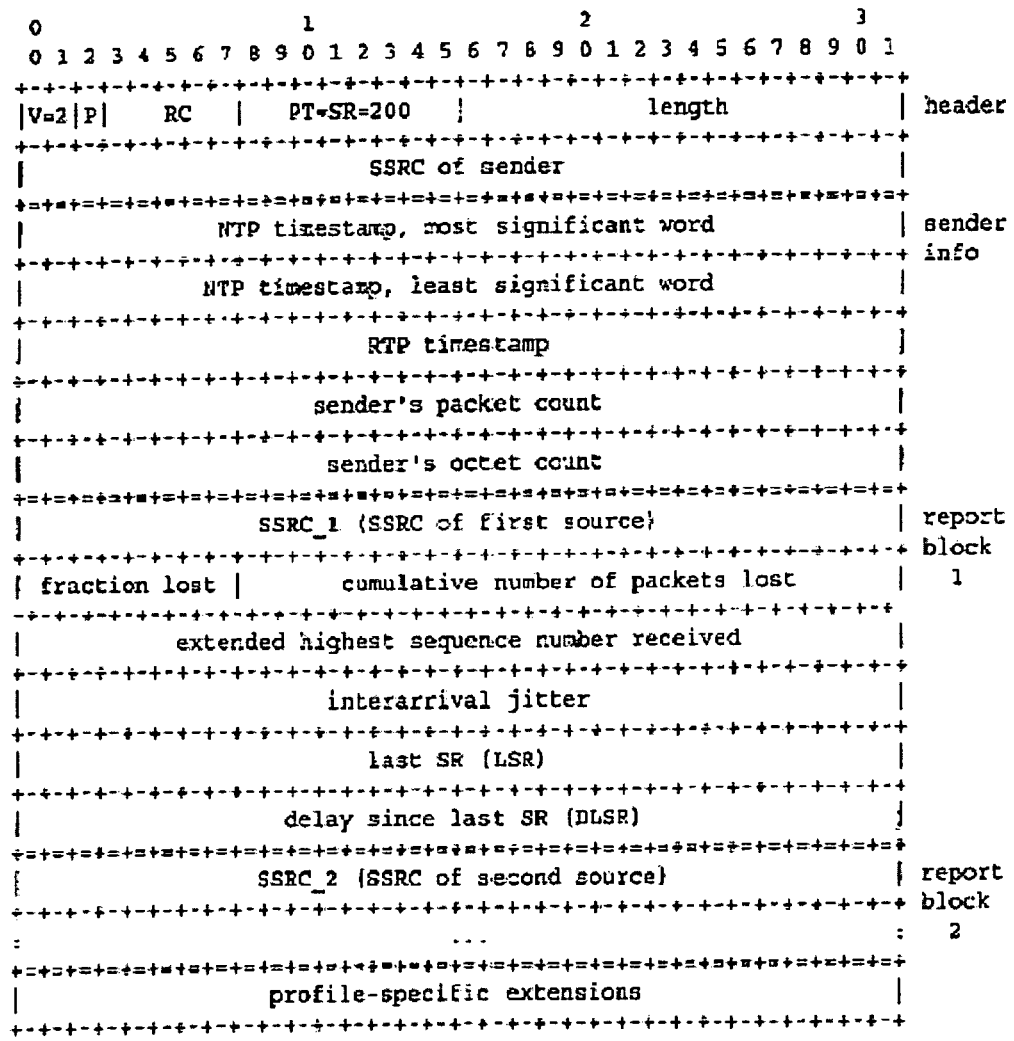
FIG. 7 is schematic representation of a conventional RTCP datagram.

The RTP data transport protocol is augmented by a control protocol (RTCP) to allow monitoring of data delivery (allowing scalability to multicast communication), and to provide some control and identification functionality. Under RTCP, sources and receivers periodically send RTCP packets to each other (using different ports). Each RTCP packet comprises either a sender report or a receiver report followed by a source description (SDES). Sender reports (SR) are generated by the RTP sources. Receiver report (RR) are generated by the RTP receivers. Source description packets, used for session control, include a globally unique identifier, CNAME, and also identify the sender by name, e-mail and phone number. Both sender reports and receiver reports include lost packet and jitter information. The jitter information is obtained from the timestamp. A sender report RTCP datagram is shown in FIG. 7.

Referring again to FIG. 2, the network monitoring subsystem 110 monitors, at network location 120, the RTP data packets originated by the phone call (network transmission event) from the calling telephone 150 (i.e., source) to the receiving telephone 185 (i.e., receiver). In one embodiment, the network monitoring subsystem is a network analyzer such as, but not limited to, a "J6800A Network Analyzer (hardware) and J6844A Telephony Network Analyzer (software)" from AGILENT TECHNOLOGIES, Inc. In one embodiment, as disclosed in U.S. Patent Application Pub. No. 2004/ 0066753, published on Apr. 8, 2004, which is hereby incorporated by reference, the network monitoring subsystem 110 extracts and monitors RTCP SR/RR packets between the source 150 and the receiver 185. The network monitoring subsystem 110 extracts RTCP SR/RR packets using conventional methods. Once the network monitoring subsystem 110 extracts the RTCP SR/RR packet, the RR packet is parsed and jitter and packet loss data are extracted therefrom. Similarly, the SR packet is parsed and data corresponding to a number of packets and octets sent is extracted therefrom. From the SSRC (and, in some embodiments, the source port and destination port from the related RTP/UDP packet), identifying information for the network transmission event (VoIP phone call) is obtained.

A quality of service (QOS) measure, such as, but not limited to, a calculated Mean Opinion Score, may be determined based on the jitter and the packet loss where each is provided a weighing value and thresholds. Preselected thresholds for jitter, packet loss and/or QOS are provided. The extracted data or a quantity derived from the extracted data is compared against a threshold in order to determine whether a predetermined condition has occurred. If a predetermined condition has occurred, the identifying information is provided from network monitoring subsystem 110 to a central monitoring server 130 (location). From the central monitoring server 130 (location), the identifying information is provided to each (or at least one) of the other network monitoring devices 140, 160, 180, 190 at each of the other network locations 150, 170, 185, 195. At each of the other network locations 150, 170, 185, 195, the network transmission event (phone call) corresponding to the identifying information is monitored, in one embodiment, in the manner described herein above. Network transmission event information, such as jitter, packet loss and/or QOS, from the first network location 120 and the other network locations 150, 170, 185, 195, obtained from the network monitoring devices 110, 140, 160, 180, and 190, is provided to the central monitoring server (location) 130. A coordinated view of the network transmission corresponding to the network transmission event (phone call) is then obtained at the central monitoring server 130. From the coordinated view of the network transmission, a location and nature of the root cause of the predetermined condition can be obtained.

While in the preceding example the network monitoring subsystem 110 provides the identifying information to a central monitoring server 130 (location), the location of the network monitoring subsystem that provides the identifying information to the central monitoring server is not a limitation of this invention. Any of the other network monitoring devices 140, 160, 180, or 190 could be the network monitoring subsystem (device) that provides the identifying information to the central monitoring server.

While the above described example relates to VoIP and real time protocols, it should be noted that this invention is not limited to only such networks and protocols. The methods and systems of this invention can be applied, but is not limited to, to other media over real time networks, and to non real time networks and protocols where source and destination are available from the protocol datagram.

It should be also noted that the central monitoring location (server) could be implemented in hardware, software or a combination thereof. An exemplary embodiment of the central monitoring location (server) is the J6782A Network Troubleshooting Center (NTC) from Agilent Technologies, Inc., a software based system. It should also be noted that this invention is not limited to that embodiment.

Furthermore, the exemplary network 100 is each simplified for ease of explanation. The networks 100 may include more or fewer additional elements such as networks, communication links, proxies, firewalls or other security mechanisms, Internet Service Providers (ISPs), MCUs, gatekeepers, gateways, and other elements.

In general, the techniques described above may be implemented, for example, in hardware, software, firmware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to data entered using the input device to perform the functions described and to generate output information. The output information may be applied to one or more output devices.

Elements and components described herein may be further divided into additional components or joined together to form fewer components for performing the same functions.

Each computer program (code) within the scope of the claims below may be implemented in any programming language, such as assembly language, machine language, a high-level procedural programming language, or an object-oriented programming language. The programming language may be a compiled or interpreted programming language.

Each computer program may be implemented in a computer program product tangibly embodied in a computer-readable storage device for execution by a computer processor. Method steps of the invention may be performed by a computer processor executing a program tangibly embodied on a computer-readable medium to perform functions of the invention by operating on input and generating output.

Common forms of computer-readable or usable media include, for example, a floppy disk, a flexible disk, hard disk, magnetic tape, or any other magnetic medium, a CDROM, any other optical medium, punched cards, paper tape, any other physical medium with patterns of holes, a RAM, a PROM, and EPROM, a FLASH-EPROM, any other memory chip or cartridge, or any other medium from which a computer can read.

Although the invention has been described with respect to various embodiments, it should be realized this invention is also capable of a wide variety of further and other embodiments within the spirit and scope of the appended claims.

What is claimed is:

1. A method for coordinated monitoring of network transmission events, the method comprising:
    monitoring a network transmission event at a network location using a first network monitoring device;
    detecting a predetermined condition in the network transmission event at the network location;
    obtaining, at the network location, predetermined information relating to the network transmission event;
    providing the predetermined information from the first network monitoring device to a predetermined monitoring location;
    providing, from the predetermined monitoring location, the predetermined information to at least one second network monitoring device at an at least one other network location;
    monitoring, at the at least one other network location, the network transmission event corresponding to the predetermined information; and
    providing, to the predetermined monitoring location, information relating to the network transmission event, the information being obtained at the network location and the at least one other network location.

2. The method of claim 1 further comprising
    determining a location and nature of a root cause of the predetermined condition.

3. The method of claim 1 wherein the network transmission comprises a network transmission utilizing an Internet Protocol.

4. The method of claim 3 wherein the network transmission event is a voice over Internet Protocol (IP) transmission.

5. The method of claim 3 where in the predetermined condition is obtained from data according to a real time protocol.

6. A system for coordinated monitoring of network transmission events, the system comprising:
    a network monitoring subsystem capable of monitoring a network transmission event at a network location, said network monitoring subsystem having processing capabilities;
    means for detecting a predetermined condition in the network transmission event at the network location;
    means for obtaining, at the network location, predetermined information relating to the network transmission event;
    a predetermined monitoring subsystem having processing capabilities;
    means for providing the predetermined information from the network monitoring subsystem to said predetermined monitoring subsystem;
    another network monitoring subsystem at another network location, said another network monitoring subsystem having processing capabilities;
    means for providing, from said predetermined monitoring subsystem, the predetermined information to said another network monitoring subsystem at the another network location;
    means for monitoring, at the another network location, the network transmission event corresponding to the predetermined information; and
    means for providing from said network monitoring subsystem and said another network monitoring subsystem, to the predetermined monitoring subsystem, information related to the network transmission event.

7. The system of claim 6 wherein the network transmission comprises a network transmission utilizing an Internet Protocol.

8. The system of claim 7 wherein the network transmission event is a voice over Internet Protocol (IP) transmission.

9. The system of claim 7 wherein the predetermined condition and the information related to the network transmission event are obtained from data according to a real time protocol.

10. A computer program product comprising:
    at least one non-transitory computer usable medium having computer readable code embodied therein, the computer readable code capable of causing at least one processor to:
    monitor a network transmission event at a network location using a first network monitoring device;
    detect a predetermined condition in the Network transmission event at the network location;
    obtain, at the network location, predetermined information for the network transmission event;

provide the predetermined information from the first network monitoring device to a predetermined monitoring location;

provide, from the predetermined monitoring location, the predetermined information to at least one second network monitoring device located at an at least one other network location;

monitor, at the at least one other network location, the network transmission event corresponding to the predetermined information using the second network monitoring device; and provide, to the predetermined monitoring location, information relating to the network transmission event, the information being obtained at the network location and the at least one other network location.

11. The computer program product of claim 10 wherein the computer readable code is also capable of causing at least one processor to:
    determine a location and nature of a root cause of the predetermined condition.

12. The computer program product of claim 10 wherein the network transmission comprises a network transmission utilizing an Internet Protocol.

13. The computer program product of claim 12 wherein the network transmission event is a voice over Internet Protocol (IP) transmission.

14. The computer program product of claim 10 wherein the predetermined condition and the information relating to the network transmission event are obtained from data according to a real time protocol.

* * * * *